United States Patent
Bödiger et al.

(12)

(10) Patent No.: US 6,835,798 B1
(45) Date of Patent: Dec. 28, 2004

(54) METHOD OF PRODUCING POLYCARBONATES

(75) Inventors: Michael Bödiger, League City, TX (US); Steffen Kühling, Meerbusch (DE); Franky Bruynseels, Sint-Gillis-Waas (DE); Dirk van Meirvenne, Chonburi (TH); René de Cleyn, Wuustwezel (BE)

(73) Assignees: Bayer Aktiengesellschaft, Leverkusen (DE); Bayer Antwerpen N.V., Antwerp (BE)

( * ) Notice: Subject to any disclaimer, the term of this patent is extended or adjusted under 35 U.S.C. 154(b) by 216 days.

(21) Appl. No.: 10/111,925

(22) PCT Filed: Oct. 23, 2000

(86) PCT No.: PCT/EP00/10397

§ 371 (c)(1),
(2), (4) Date: Aug. 5, 2002

(87) PCT Pub. No.: WO01/32746

PCT Pub. Date: May 10, 2001

(30) Foreign Application Priority Data

Nov. 3, 1999 (DE) .......................................... 199 52 848

(51) Int. Cl.$^7$ ............................................... C08G 64/00
(52) U.S. Cl. .................... 528/196; 264/176.1; 264/219; 348/552; 502/157; 528/198
(58) Field of Search .............................. 264/176.1, 219; 348/552; 502/157; 528/196, 198

(56) References Cited

U.S. PATENT DOCUMENTS 6,710,154 B2 * 3/2004 van Osselaer et al. ...... 528/196

FOREIGN PATENT DOCUMENTS

| DE | 37 06 205 | 9/1988 |
| EP | 0 460 646 | 12/1991 |
| EP | 0 615 996 | 9/1994 |
| EP | 0 264 885 | 1/2000 |

OTHER PUBLICATIONS

Hermann Schnell, Chemistry and Physics of Polycarbonates, Polymer Reviews, vol. IX, (month unavailable) 1964, pp. 31–41 Preparation of Aromatic Polycarbonates.
Patent Abstracts of Japan, vol. 1, No. 54 (C–014), May 25, 1977, & JP 52 015499 A (Nippon Soda Co Ltd), Feb. 5, 1977 Zusammenfassung & Database WPI Week 197711 Derwent Publications Ltd., London, GB; AN 1977–19178Y Zusammenfassung.
Patent Abstracts of Japan, vol. 1995, No. 11, Dec. 26, 1995 & JP 07 196783 A (Mitsui Toatsu Chem Inc), Aug. 1, 1995 in der Anmeldung erwähnt Zusammenfassung & Database WPI Week 199539 Derwent Publications Ltd., London, GB; AN 1995–299632 Zusammenfassung.

* cited by examiner

*Primary Examiner*—Terressa Boykin
(74) *Attorney, Agent, or Firm*—Joseph C. Gil; John E. Mrozinski, Jr.; Noland J. Cheung

(57) ABSTRACT

A process for the preparation of polycarbonate by the phase boundary process is disclosed. The process entails reacting at least one dihydroxydiarylalkane in the form of its alkali metal salts with phosgene in the heterogeneous phase in the presence of sodium hydroxide solution and an organic solvent. The process is characterized in that the feedstock have but low content of Fe, Cr, Ni, Zn, Ca, Mg, Al metals or homologues thereof, and in that the organic solvent is separated off, and in that the polycarbonate which is obtained is worked up. The resulting polycarbonate is particularly useful in producing transparent shaped articles.

12 Claims, No Drawings

METHOD OF PRODUCING POLYCARBONATES

FIELD OF THE INVENTION

The invention relates to a process for the preparation of polycarbonates, the polycarbonate substrates of particularly high purity obtainable by the process and the shaped articles which can be produced from the polycarbonate substrate.

BACKGROUND OF THE INVENTION

Polycarbonate is prepared by the so-called phase boundary process, in which dihydroxydiarylalkanes in the form of their alkali metal salts are reacted with phosgene in the heterogeneous phase in the presence of inorganic bases, such as sodium hydroxide solution, and an organic solvent in which the product, polycarbonate, is readily soluble. During the reaction the aqueous phase is dispersed in the organic phase, and after the reaction the organic polycarbonate-containing phase is washed with an aqueous liquid, during which, inter alia, electrolytes are to be removed, and the wash liquid is then separated off (H. Schnell "Chemistry and Physics of Polycarbonates", Polymer Review, vol. IX p. 33 et seq, Interscience Publishers, New York 1964).

For washing the polycarbonate-containing solution, EP-A-264885 proposes stirring the aqueous wash liquid with the polycarbonate solution and separating out the aqueous phase by centrifuging.

Japanese Application JP-A-07 19 67 83 describes a process for the preparation of polycarbonate in which the content of iron in the sodium hydroxide solution used should be below 2 ppm in order to achieve favourable colour properties.

The object of the present invention is to provide an alternative and improved process for the preparation of pure polycarbonate or polycarbonate substrates and to provide polycarbonate shaped articles with a low foreign particle content.

Surprisingly, it has now been found that polycarbonate and polycarbonate substrates with a low foreign particle content are obtained if a specific process is used.

SUMMARY OF THE INVENTION

The present application therefore provides a process for the preparation of polycarbonate by the phase boundary process, in which dihydroxydiarylalkanes in the form of their alkali metal salts are reacted with phosgene in the heterogeneous phase in the presence of sodium hydroxide solution and an organic solvent, characterised in that
a) the feedstocks are low in Fe, Cr, Ni, Zn, Ca, Mg and Al metals or their homologues;
b) the organic solvent is separated off and
c) the polycarbonate obtained is worked up.

DETAILED DESCRIPTION OF THE INVENTION

In the context of the invention, low in the metals mentioned or their chemical homologues means that preferably not more than 2 ppm, more preferably not more than 1 ppm, particularly preferably not more than 0.5 ppm, and most particularly preferably not more than 0.2 ppm of total metal, in particular of the metals listed above and homologues thereof, are contained in the feedstocks. The alkali metals are excluded from these limit values.

The feedstock sodium hydroxide solution should preferably be low in the metals mentioned. In particular, the sodium hydroxide solution should in each case contain not more than 1 ppm, preferably not more than 0.5 ppm, more preferably not more than 0.3 ppm of alkaline earth metal or homologues thereof, in relation to 100 wt. % NaOH content. In particular, the feedstock sodium hydroxide solution should contain not more than 1 ppm, preferably not more than 0.5 ppm, more preferably not more than 0.1 ppm of iron, in relation to a 100 wt. % NaOH content.

In the process according to the invention, the sodium hydroxide solution is preferably used as a 20–55 wt. %, particularly preferably 30–50 wt. % solution.

Sodium hydroxide solution with the afore-mentioned limit values is obtainable by the membrane process known from the literature.

In a preferred embodiment, in addition to the sodium hydroxide solution the feedstocks bisphenol, in particular bisphenol and water, most particularly preferably the bisphenol, water and the organic solvent, are low in metals, in particular low in Fe, Cr, Ni, Zn, Ca, Mg and Al.

Embodiments in which sodium bisphenolate (solution) has been prepared previously from sodium hydroxide solution and bisphenol(s) are also included here.

These low-metal feedstocks are obtained by a procedure in which in a preferred embodiment the solvent is distilled, the bisphenol is crystallised, preferably crystallised several times or distilled, and fully deionised water is used.

The fully deionised water is preferably desalinated, degassed and/or desilicified. A quality criterion is e.g. the electrical conductivity (sum parameter for ionogenic substances of the salts still present in the water in traces), the fully deionised water in the process according to the invention being characterised by an electrical conductivity of 0.2 $\mu$S/cm (DIN 38404 C 8) and an $SiO_2$ concentration of 0.02 mg/kg (VGB 3.3.1.1) or in each case less. The content of dissolved oxygen in the fully deionised water is preferably less than 1 ppm, preferably less than 100 ppb. This oxygen content is preferably established for all the starting substances and process steps.

In a further preferred embodiment, from the group of feedstocks at least the sodium hydroxide solution, preferably additionally also the bisphenol, particularly preferably the sodium hydroxide solution, the bisphenol and the water, most particularly preferably the sodium hydroxide solution, the bisphenol, the water and the organic solvent, are filtered at least once, preferably twice, most particularly preferably stepwise three times, before the start of the reaction.

The invention also provides a process for the preparation of polycarbonate by the phase boundary process, in which dihydroxydiarylalkanes in the form of their alkali metal salts are reacted with phosgene in the heterogeneous phase in the presence of sodium hydroxide solution and an organic solvent, characterised in that
a) the feedstocks are low in Fe, Cr, Ni, Zn, Ca, Mg and Al metals or their homologues;
d) the aqueous phase formed during the reaction is separated off and the organic polycarbonate phase separated off is washed with an aqueous liquid and
e) the washed organic polycarbonate phase which has been separated off from the wash liquid is heated, optionally after a filtration, and filtered hot at least once;
b) the organic solvent is separated off and
c) the polycarbonate obtained is worked up.

In a preferred embodiment, the reaction mixture is filtered in process step d) directly after the reaction and/or the resulting organic polycarbonate phase which has been separated off is filtered and/or the organic polycarbonate phase separated off in process step e) is filtered.

Preferably, at least two of these filtrations, in particular all three filtrations, are performed.

In a preferred embodiment, filtration is performed at least once, preferably twice, particularly preferably at least three times, in particular stepwise, especially in the case of the hot filtration. In the case of stepwise filtration, coarser filters are used at the beginning, to be then changed for finer filters. It is preferable to carry out the filtration of the two-phase media in process step d) with coarser filters.

In process step e), filters of small pore size are used for the hot filtration. It is important for this that the polycarbonate phase is present as a solution which is as homogeneous as possible. This is achieved by heating the organic polycarbonate phase, which in general still contains residues of aqueous wash liquid. The wash liquid is dissolved here and a clear solution is formed. The previously dissolved impurities, in particular the dissolved alkali metal salts, precipitate out and can be filtered off.

In addition to the process described above, the known freezing-out process can also be used to achieve a homogeneous solution.

Membrane filters and sintered metal filters or also bag filters are used as the filters for carrying out the filtration according to the invention. The pore sizes of the filters are as a rule 0.01 to 5 μm, preferably 0.02 to 1.5 μm, more preferably about 0.05 μm to 1.0 μm. Such filters are commercially obtainable, for example, from the companies Pall GmbH, D-63363 Dreieich, and Krebsböge GmbH, D-42477 Radevormwald (type SIKA-R CU1AS).

Significantly better filter service lives are obtained by combination of the processes according to the invention.

Performing the other process steps is known in general. Thus, the aqueous phase is emulsified in the organic phase during the reaction. Droplets of varying size are then formed. After the reaction, the organic phase containing the polycarbonate is usually washed several times with an aqueous liquid and separated from the aqueous phase as far as possible after each washing operation. Washing is preferably performed with very finely filtered, low-metal water. After washing and separating off the wash liquid, the polymer solution is usually cloudy. The wash liquid used is aqueous liquid for separating off the catalyst, a dilute mineral acid, such as HCl or $H_3PO_4$, and completely desalinated water for further purification. The concentration of HCl or $H_3PO_4$ in the wash liquid can be, for example, 0.5 to 1.0 wt. %. By way of example and preferably, the organic phase is washed five times.

Phase separation devices which can be used for separating off the wash liquid from the organic phase are the separation vessels, phase separators, centrifuges or coalescers which are known in principle, or also combinations of these devices.

To obtain the high purity polycarbonate, the solvent is evaporated off. The evaporation can be performed in several evaporator stages. According to a further preferred embodiment of this invention, the solvent or some of the solvent can be removed by spray drying. The high purity polycarbonate is then obtained as a powder. The same applies to obtaining the high purity polycarbonate by precipitation from the organic solution and subsequent drying of the residue. For example, extrusion is a suitable means for evaporation of residual solvent. Another technology is strand evaporation technology.

Compounds which are preferably to be used as feedstocks are bisphenols of the general formula HO-Z-OH, wherein Z is an organic radical having 6 to 30 carbon atoms, which contains one or more aromatic groups. Examples of such compounds are bisphenols which belong to the group of dihydroxydiphenyls, bis(hydroxyphenyl)alkanes, indanebisphenols, bis(hydroxy-phenyl) ethers, bis(hydroxyphenyl) sulfones, bis(hydroxyphenyl) ketones and α,α'-bis(hydroxyphenyl)diisopropylbenzenes.

Particularly preferred bisphenols which belong to the afore-mentioned groups of compounds are 2,2-bis-(4-hydroxyphenyl)-propane (bisphenol A/BPA), tetraalkylbisphenol A, 4,4-(meta-phenylenediisopropyl)-diphenol (bisphenol M), 1,1-bis-(4-hydroxyphenyl)-3,3,5-trimethylcyclohexanone and optionally mixtures thereof. Particularly preferred copolycarbonates are those based on the monomers bisphenol A and 1,1-bis-(4-hydroxyphenyl)-3,3,5-trimethylcyclohexane. The bisphenol compounds to be used according to the invention are reacted with carbonic acid compounds, in particular phosgene.

The polyester carbonates are obtained by reaction of the bisphenols already mentioned, at least one aromatic dicarboxylic acid and optionally carbonic acid. Suitable aromatic dicarboxylic acids are, for example, orthophthalic acid, terephthalic acid, isophthalic acid, 3,3'- or 4,4'-diphenyldicarboxylic acid and benzophenonedicarboxylic acids.

Inert organic solvents used in the process are, for example, dichloromethane, the various dichloroethanes and chloropropane compounds, chlorobenzene and chlorotoluene, and dichloromethane and mixtures of dichloromethane and chlorobenzene are preferably used.

The reaction can be accelerated by catalysts, such as tertiary amines, N-alkylpiperidines or onium salts. Tributylamine, triethylamine and N-ethylpiperidine are preferably used. A monofunctional phenol, such as phenol, cumylphenol, p-tert.-butylphenol or 4-(1,1,3,3-tetramethylbutyl)phenol, can be used as a chain terminator and molecular weight regulator. Isatin-biscresol, for example, can be used as a branching agent.

To prepare the high purity polycarbonates, the bisphenols are dissolved in an aqueous alkaline phase, preferably sodium hydroxide solution. The chain terminators optionally necessary for the preparation of copolycarbonates are dissolved in the aqueous alkaline phase or added to this in bulk in an inert organic phase in amounts of 1.0 to 20.0 mol. % per mol of bisphenol. Phosgene is then passed into the mixer containing the remaining reaction constituents and the polymerisation is performed.

Chain terminators which are optionally to be used are both monophenols and monocarboxylic acids. Suitable monophenols are phenol itself, alkylphenols, such as cresols, p-tert.-butylphenol, p-cumylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol, and mixtures thereof.

Suitable monocarboxylic acids are benzoic acid, alkylbenzoic acids and halobenzoic acids.

Preferred chain terminators are the phenols of the formula (I)

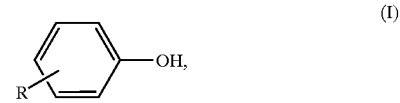

wherein
R is hydrogen, tert.-butyl or a branched or unbranched $C_8$— and/or $C_9$-alkyl radical.

The preferred chain terminator is phenol and p-tert.-butylphenol.

The amount of chain terminator to be used is 0.1 mol. % to 5 mol. %, in relation to the moles of diphenols used in each case. The chain terminators can be added before, during or after the phosgenation.

Branching agents can optionally also be added to the reaction. Preferred branching agents are the compounds which are tri- or more than trifunctional and are known in polycarbonate chemistry, in particular those with three or more than three phenolic OH groups.

By way of example and preferably, branching agents are also phloroglucinol, 4,6-dimethyl-2,4,6-tri-(4-hydroxyphenyl)-hept-2-ene, 4,6-dimethyl-2,4,6-tri-(4-hydroxy-phenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2, 4-dihydroxy-phenyl)-propane, hexa-(4-(4-hydroxyphenyl-isopropyl)-phenyl)-orthoterephthalic acid ester, tetra-(4-hydroxyphenyl)-methane, tetra-(4-(4-hydroxyphenyl-isopropyl)-phenoxy)-methane and 1,4-bis-(4',4"-dihydroxytriphenyl)-methyl)-benzene and 2,4-dihydroxybenzoic acid, trimesic acid, cyanuric chloride and 3,3-bis-(3-methyl-4 hydroxyphenyl)-2-oxo-2,3-dihydroindole.

The amount of branching agents optionally to be used is 0.05 mol. % to 2 mol. %, again in relation to the moles of diphenols used in each case.

The branching agents can be either initially introduced into the aqueous alkaline phase with the diphenols and the chain terminators, or added as a solution in an organic solvent before the phosgenation.

Some, up to 80 mol. %, preferably 20 to 50 mol. % of the carbonate groups in the polycarbonates can be replaced by aromatic dicarboxylic acid ester groups.

The polycarbonates according to the invention are both homopolycarbonates and copolycarbonates and mixtures thereof. The polycarbonates according to the invention can be aromatic polyester carbonates or polycarbonates which are present as a mixture with aromatic polyester carbonates. The term polycarbonate stands representatively for the polycarbonate substrates obtainable by the processes according to the invention.

The polycarbonates have average molecular weights M, (determined by measurement of the relative viscosity at 25° C. in dichloromethane at a concentration of 0.5 g polycarbonate/100 ml dichloromethane) of 12,000 to 400,000, preferably 23,000 to 80,000, and in particular 24,000 to 40,000.

Shaped articles according to the invention which are produced from the high purity polycarbonate substrates according to the invention are, in particular, optical and magneto-optical data storage media, such as a mini-disk, compact disk or digital versatile disk, optical lenses and prisms, glazing for motor vehicles and headlamps, glazing of another type, such as for greenhouses, so-called double-walled sheets or hollow chamber sheets or solid sheets. These shaped articles are produced by injection moulding processes, extrusion processes and extrusion blow-moulding processes using the polycarbonate according to the invention of suitable molecular weight.

The preferred molecular weight range for the data carriers is 12,000 to 22,000, that for lenses and glazing is 22,000 to 32,000, and that of sheets and hollow chamber sheets is 28,000 to 40,000. All the molecular weight data relate to the weight-average molecular weight.

The shaped articles according to the invention optionally have a surface treatment, for example a scratch-resistant coating.

To produce optical lenses and films or disks for magneto-optical data carriers, the polycarbonates according to the invention are preferably used with a molecular weight of 12,000 to 40,000, since a material with a molecular weight in this range can very readily be shaped thermoplastically. The shaped articles can be produced by injection moulding processes. For this, the resin is melted at temperatures of 300 to 400° C. and the mould is in general kept at a temperature of 50 to 140° C.

To produce, for example, a sheet-like data storage material, the high purity polycarbonate article according to the invention is used in known plastics injection moulding machines suitable for this.

In addition to increasing the life of the filters, another advantage of the processes according to the invention is that the resulting polycarbonate substrates are distinguished by a particularly low number of fewer than 250, in particular fewer than 150 defects per $m^2$ measured on a 200 μm extruded film.

The following examples serve to explain the invention. The invention is not limited to the examples.

EXAMPLES

Example 1

To prepare the polycarbonates, BPA (SPA is brought together continuously as a melt with sodium hydroxide solution) is mixed into sodium hydroxide solution with exclusion of oxygen. The sodium hydroxide solution used has different concentrations and purities (see Table 1), the original sodium hydroxide solution being diluted still further to a 6.5% sodium hydroxide solution with filtered fully deionised water in order to dissolve the bisphenols. This sodium bisphenolate solution is now filtered (0.6 μa filter) and used in the polycarbonate reaction. After the reaction the reaction solution is filtered through a 1.0 μnom bag filter and supplied for washing. In this, it is washed with 0.6% hydrochloric acid and then post washed a further 5 times with filtered fully deionised water. The organic solution is separated off from the aqueous solution and, after the organic solution has been heated to 55° C., is filtered first with a 0.6 μa filter and then through a 0.2 μa filter. After isolation, poly-2,2-bis-(4-hydroxyphenyl)-propane carbonate is obtained. The polycarbonate has an average molecular weight of $M_w$=26,000.

TABLE 1

| Sodium hydroxide solution quality | | | |
|---|---|---|---|
| | 1 | 2 | 3 |
| % NaOH | 50 | 50 | 32% |
| Fe (ppm) | 0.7 | 0.46 | 0.02 |
| Ca (ppm) | 2.0 | 0.4 | <0.1 |
| Mg (ppm) | 0.5 | 0.2 | <0.1 |
| Ni (ppm) | 0.2 | 0.2 | <0.01 |
| Cr (ppm) | 0.4 | 0.25 | <0.01 |
| Zn (ppm) | 0.1 | 0.05 | 0.06 |
| Total (ppm) | 3.9 | 1.56 | <0.3 |
| Conc. in 100% NaOH | | | |
| Fe (ppm) | 1.4 | 0.9 | 0.06 |
| Ca (ppm) | 4.0 | 0.8 | <0.3 |
| Mg (ppm) | 1.0 | 0.4 | <0.3 |

TABLE 1-continued

| | Sodium hydroxide solution quality | | |
|---|---|---|---|
| | 1 | 2 | 3 |
| Ni (ppm) | 0.4 | 0.4 | <0.03 |
| Cr (ppm) | 0.8 | 0.5 | <0.03 |
| Zn (ppm) | 0.2 | 0.1 | 0.19 |
| Total (ppm) | 7.8 | 3.1 | <0.9 |

TABLE 2

| | Sodium hydroxide solution from experiment | | |
|---|---|---|---|
| Filter service life | 1 | 2 | 3 |
| Before the reaction 0.6 μa filter | 12 h | 10 d | 30 d |
| After the reaction 1.0 μa filter | 24 h | 30 d | >60 d |
| End filter 1 = 0.6 μa filter End filter 2 = 0.2 μa filter | 12 h | 3 d | 21 d |

Films are extruded from the polycarbonates prepared with sodium hydroxide solution from experiments 1 to 3 and these are subjected to a film laser scan test by means of the known method described below.

The extruded film is 200 μm thick and 60 mm wide. An He/Ne laser ("spot diameter" of 0.1 mm) scans the film with a scan frequency of 5,000 Hz across the width and a transportation speed of 5 m/s in the longitudinal direction. All defects which cause scattering of the laser beam passing through (from 0.10 mm diameter) are detected by a photo-multiplier and counted by software. The number of optical defects per kg of polycarbonate or per $m^2$ of film is a measure of the surface quality of this film and of the purity of the PC.

| | Evaluation of extruded film with a laser scanner | | |
|---|---|---|---|
| | PC prepared with sodium hydroxide solution from experiment | | |
| # per $m^2$ surface area | 1 | 2 | 3 |
| 0.10–0.30 mm | 121 | 64 | 23 |
| >0.30 mm | 148 | 96 | 35 |
| Total | 269 | 160 | 58 |

What is claimed is:

1. A process for the preparation of polycarbonate by the phase boundary process, comprising the step of reacting dihydroxydiarylalkanes in the form of their alkali metal salts with phosgene in the heterogeneous phase in the presence of sodium hydroxide solution and an organic solvent, wherein
   a) the feedstocks are low in Fe, Cr, Ni, Zn, Ca, Mg and Al metals or their homologues;
   b) the organic solvent is separated off and
   c) the polycarbonate obtained is worked up.

2. A process for the preparation of polycarbonate by the phase boundary process, comprising the step of reacting dihydroxydiarylalkanes in the form of their alkali metal salts with phosgene in the heterogeneous phase in the presence of sodium hydroxide solution and an organic solvent, wherein
   a) the feedstocks are low in Fe, Cr, Ni, Zn, Ca, Mg and Al metals or their homologues;
   d) the aqueous phase formed during the reaction is separated off, optionally after a filtration, and the organic polycarbonate phase separated off is washed with an aqueous liquid, optionally after a filtration, and
   e) the washed organic polycarbonate phase which has been separated off from the wash liquid is heated, optionally after a filtration, and filtered hot at least once;
   b) the organic solvent is separated off and
   c) the polycarbonate obtained is worked up.

3. A process according to claim 1, wherein the feedstocks contain less than 2 ppm of metals or their homologues.

4. A process according to claim 1, wherein the sodium hydroxide solution used contains not more than 0.5 wt. % alkaline earth metal or homologues thereof and/or not more than 0.5 wt. % Fe, in relation to a 100 wt. % NaOH content.

5. A process according to claim 1, wherein in addition to the sodium hydroxide solution, the feedstock bisphenol is also low in Fe, Cr, Ni, Zn, Ca, Mg and Al metals or their homologues.

6. A process according to claim 1, wherein from the group of feedstocks, at least the sodium hydroxide solution is filtered before the start of the reaction.

7. A process according to claim 1, wherein filters with a pore size of less than 2 μm are used in the last filtration stages.

8. A polycarbonate obtained by the process of according to claim 1.

9. A polycarbonate comprising less than 250 defects per $m^2$ measured on a 200 μm extruded film.

10. A transparent shaped article comprising a polycarbonate produced by the phase boundary process, comprising the step of reacting, dihydroxydiarylalkanes in the form of their alkali metal salts with phosgene in the heterogeneous phase in the presence of sodium hydroxide solution and an organic solvent, wherein
   a) the feedstocks are low in Fe, Cr, Ni, Zn, Ca, Mg and Al metals or their homologues;
   b) the organic solvent is separated off and
   c) the polycarbonate obtained is worked up.

11. A transparent shaped article comprising a polycarbonate comprising less than 250 defects per $m^2$ measured on a 200 μm extruded film.

12. A transparent shaped article according to claim 10, wherein said shaped article is a laser-readable data storage media.

* * * * *